C. B. DALZELL.
DRIVE FOR CENTRIFUGAL SEPARATING MACHINES.
APPLICATION FILED MAR. 4, 1918.

1,284,613.

Patented Nov. 12, 1918.
2 SHEETS—SHEET 1.

INVENTOR.
Charles B. Dalzell.
By Wilhelm & Parker,
ATTORNEYS.

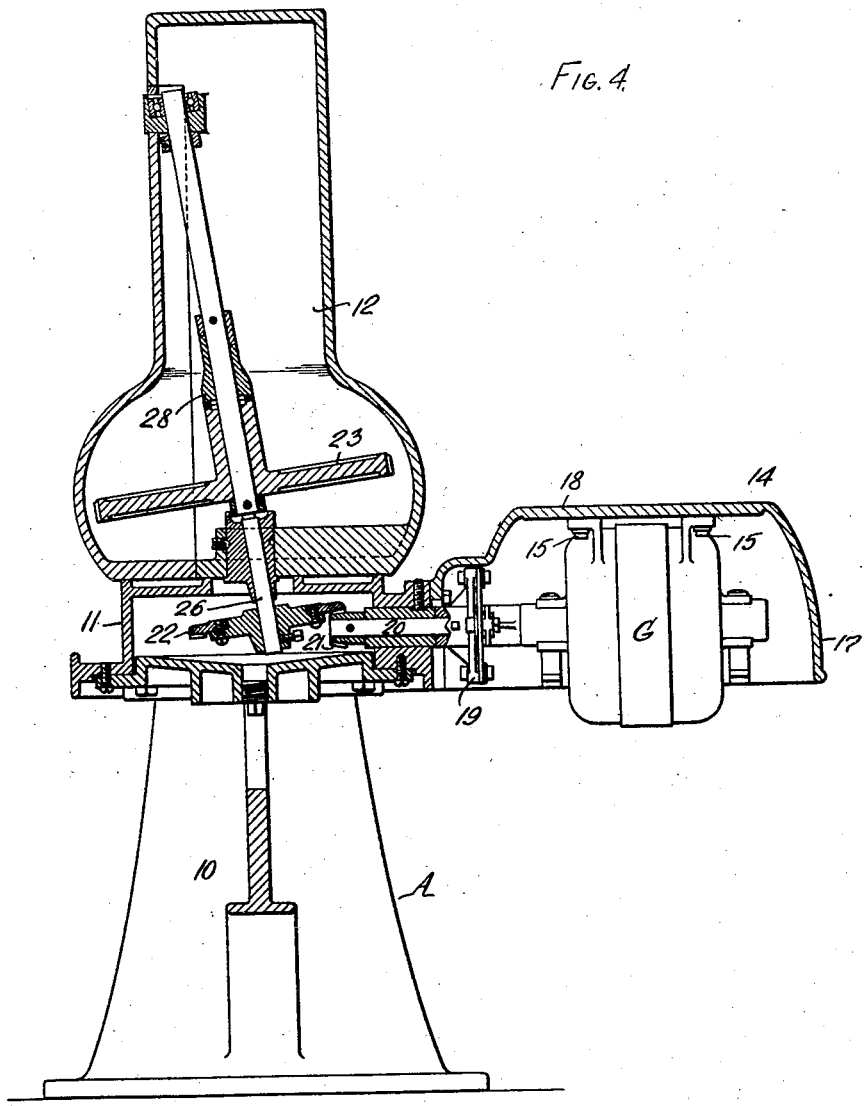

UNITED STATES PATENT OFFICE.

CHARLES B. DALZELL, OF LITTLE FALLS, NEW YORK, ASSIGNOR TO D. H. BURRELL & CO., OF LITTLE FALLS, NEW YORK.

DRIVE FOR CENTRIFUGAL SEPARATING-MACHINES.

1,284,613.      Specification of Letters Patent.      Patented Nov. 12, 1918.

Application filed March 4, 1918. Serial No. 220,188.

*To all whom it may concern:*

Be it known that I, CHARLES B. DALZELL, a citizen of the United States, residing at Little Falls, in the county of Herkimer and State of New York, have invented a new and useful Improvement in Drives for Centrifugal Separating-Machines, of which the following is a specification.

This invention relates to centrifugal separating machines and more particularly to improvements in motor-driven centrifugal cream separators in which the driving motor for the rotary separating bowl is mounted on the machine.

A great deal of trouble has been experienced with motor-driven centrifugal cream separators, and other motor-driven dairy machinery in arranging and protecting the motor so as to prevent milk and water from being spilled or splashed on the motor and thus damaging the motor.

The objects of this invention are to provide a motor-driven centrifugal separator with a supporting bracket for the motor which is constructed and arranged so as to support the motor off of the floor and provide a cover or housing for the motor which prevents water and milk or slop from being spilled or splashed on the motor; also to construct and arrange the motor-supporting bracket so that, in addition to providing a protecting cover for the motor, it also serves as a support or shelf for a pail to receive the separated liquid, thus avoiding the necessity for providing the usual separate shelf or support for the pail; and also to improve centrifugal separating machines in the other respects hereinafter described and set forth in the claims.

In the accompanying drawings:

Fig. 4 is a fragmentary sectional elevation of the separator on line 4—4, Fig. 2.

Figure 3:
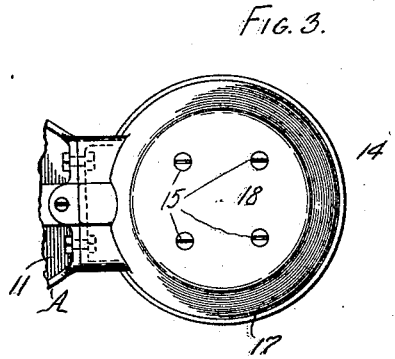
Fig. 3 is a plan view of the motor supporting bracket and a portion of the frame to which it is attached.
Figure 1:
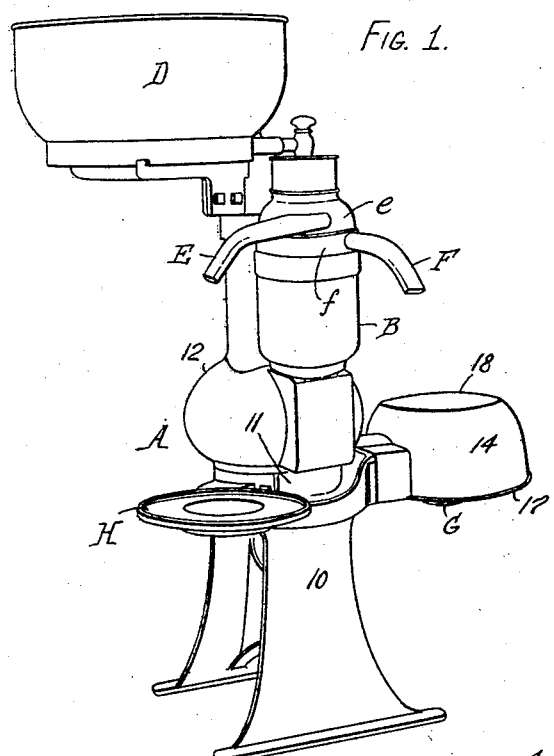
Figure 1 is a perspective view of a centrifugal cream separator embodying the invention.
Figure 2:
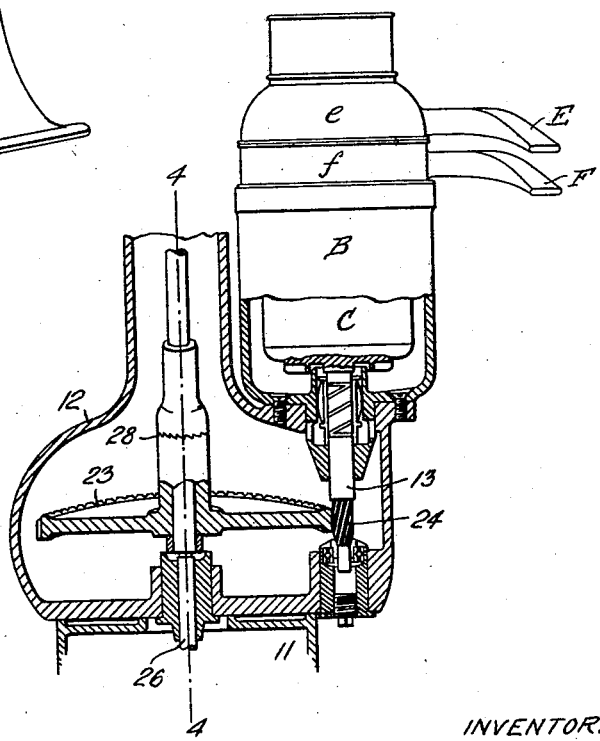
Fig. 2 is a fragmentary sectional elevation, on an enlarged scale, thereof.

The centrifugal separating machine shown in the drawings comprises, as usual, a main supporting frame or stand A, a bowl case B in which the rotary separating bowl C is housed, a pan or holder D for the milk or liquid to be separated mounted on the upper portion of the main frame and arranged to deliver the liquid to the separating bowl, collecting pans or chambers e and f for the separated liquids mounted on the bowl casing and provided with spouts E and F for discharging the separated liquids, a motor G, and suitable drive connections between the motor and the separating bowl for rotating the latter. H represents a shelf or support for a pail for receiving the liquid discharged by the discharge spout E. With the exception of the means hereinafter described for mounting and protecting the motor, the machine may be constructed as shown in the drawings or may be of any other usual or suitable construction. Preferably the stationary main frame of the machine comprises a cast metal base portion or stand 10, an intermediate hollow portion or shell 11 which is suitably mounted on the base stand 10 and forms an intermediate inclosing chamber or housing for the driving mechanism for the separating bowl, and an upper hollow portion 12 which is mounted on the intermediate casing portion 11 and houses or incloses the bowl spindle 13 and a portion of the driving mechanism connected therewith.

The motor G is supported, preferably above or off of the floor, by means of a supporting bracket or member 14 which is secured to and projects out from the main frame, and is preferably bolted or otherwise suitably secured to the intermediate hollow portion 11 of the main frame. This motor-supporting bracket 14 is preferably in the form of a hollow hood or shell which is arranged with its open side downward and covers or partially incloses the motor G, which may be secured or mounted in the hollow supporting bracket 14 in any suitable way. As shown, the motor casing is bolted to the underside of the top of the bracket 14, as by bolts 15 extending through lugs on the motor casing. The hollow motor supporting bracket preferably has a skirt or annular wall 17 which depends around the motor nearly to the bottom of the latter, so that any milk or water which is spilled or splashed on the motor supporting bracket and might otherwise get on the motor, can run down off of the bracket and will not come in contact with the motor. The upper face 18 of the top of the motor-supporting bracket is also preferably made flat or of other suitable form adapting it to serve as a shelf or support for a pail to receive the separated liquid discharging from one of the spouts, as F, for the separated liquid. The motor-supporting bracket thus replaces the usual shelf or support required for one of the receiving pails and obviates the necessity for this additional part, and any liquid which may overflow from the pail or be spilled from the spout on the bracket will drain downwardly off of the same and not come in contact with the motor.

The drive mechanism connecting the motor to the spindle of the separating bowl may be of any suitable construction. Preferably, however, the motor shaft is connected by a flexible coupling 19, arranged under and protected by the motor-supporting bracket, with a horizontal shaft 20 which is suitably journaled in the intermediate portion 11 of the frame and is connected by bevel gears 21 and 22 with an inclined shaft 26 furnished with an inclined spur gear wheel 23 which is housed in the uper hollow portion 12 of the frame and meshes with a spiral pinion 24 on the bowl spindle. A clutch 28, which may be of any usual or suitable construction, is provided for transmitting the motion of the inclined shaft 26 to the spur gear wheel 23, which wheel is rotatable on the inclined shaft.

I claim as my invention:

1. In a centrifugal separating machine, the combination with a main frame, a separating bowl, and a motor and drive connections for rotating the bowl, of a hollow support within and by which the motor is supported and which forms a protecting cover for the motor.

2. In a centrifugal separating machine, the combination with a main frame, a separating bowl, and a motor and drive connections for rotating the bowl, of a bracket which projects out from said frame and supports said motor and is provided with parts forming a protecting cover for the motor.

3. In a centrifugal separating machine, the combination with a main frame, a separating bowl, and a motor and drive connections for rotating the bowl, of a bracket which projects out from said frame and on the underside of which said motor is mounted whereby said bracket overlies and protects the motor.

4. In a centrifugal separating machine, the combination with a main frame, a separating bowl, and a motor and drive connections for rotating the bowl, of a bracket which projects out from said frame and supports said motor, said bracket having a hollow portion which covers and protects the motor.

5. In a centrifugal separating machine, the combination with a main frame, a separating bowl, and a motor and drive connections for rotating the bowl, of a bracket which projects out from said frame and supports said motor, said bracket having a top portion beneath which the motor is located and a skirt portion which depends around the motor.

6. In a centrifugal separating machine, the combination with a main frame, a separating bowl, and a motor and drive connections for rotating the bowl, of a bracket which projects out from said frame and supports said motor, said bracket having a top which overlies the motor and forms a supporting shelf for a pail.

7. In a centrifugal separating machine, the combination with a main frame, a separating bowl and a motor and drive connections for rotating the bowl, of a hollow bracket which projects out from said frame and within which said motor is mounted and supported whereby said bracket surrounds and protects the motor, said bracket having a horizontal top forming a supporting shelf for a pail.

Witness my hand this 27th day of February, 1918.

CHARLES B. DALZELL.

Witnesses:
D. H. BURRELL, JR.,
GEO. I. DALE.